(12) United States Patent
Bristol et al.

(10) Patent No.: US 10,894,208 B2
(45) Date of Patent: Jan. 19, 2021

(54) HAND-HELD CONTROLLER USING LED TRACKING RING

(71) Applicant: Facebook Technologies, LLC, Menlo Park, CA (US)

(72) Inventors: Peter Wesley Bristol, Seattle, WA (US); Yi-Yaun Chen, Seattle, WA (US); Glen Jason Tompkins, Woodinville, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/671,710

(22) Filed: Nov. 1, 2019

(65) Prior Publication Data

US 2020/0061457 A1 Feb. 27, 2020

Related U.S. Application Data

(63) Continuation of application No. 15/498,402, filed on Apr. 26, 2017, now Pat. No. 10,537,795.

(51) Int. Cl.
*G06F 1/16* (2006.01)
*H05K 5/00* (2006.01)
(Continued)

(52) U.S. Cl.
CPC .............. *A63F 13/24* (2014.09); *A63F 13/23* (2014.09); *A63F 13/25* (2014.09); *A63F 13/30* (2014.09); *A63F 2300/8082* (2013.01)

(58) Field of Classification Search
CPC .......... G06F 1/16; G06F 1/1637; G06F 3/014; A63F 13/24; A63F 13/23; A63F 13/25; A63F 13/30
(Continued)

(56) References Cited

U.S. PATENT DOCUMENTS 5,764,164 A 6/1998 Cartabiano et al.
6,572,108 B1 6/2003 Bristow
(Continued)

FOREIGN PATENT DOCUMENTS

CN 203261391 U 10/2013
EP 3 065 036 A1 9/2016
(Continued)

OTHER PUBLICATIONS

European Extended Search Report, European Application No. 17202772.4, dated Jan. 26, 2018, 7 pages.
(Continued)

*Primary Examiner* — Anthony M Haughton
(74) *Attorney, Agent, or Firm* — Fenwick & West LLP

(57) ABSTRACT

A hand-held controller includes a handle extending in a longitudinal direction. The handle is shaped and dimensioned to be grasped by a user's hand. A ring is attached to an end of the handle and surrounds a thumb of the user when the handle is grasped by the user's hand. The ring has an annular surface that defines a plane that forms a predetermined angle with respect to the longitudinal direction, and a curved outer surface. Light sources are mounted on the curved outer surface and configured to emit light to be captured by an imaging device for tracking a position or orientation of the hand-held controller. The light is emitted in a direction normal to the curved outer surface.

20 Claims, 3 Drawing Sheets

(51) Int. Cl.
*H05K 7/00* (2006.01)
*A63F 13/24* (2014.01)
*A63F 13/23* (2014.01)
*A63F 13/25* (2014.01)
*A63F 13/30* (2014.01)

(58) Field of Classification Search
USPC ........................................ 361/679.01–679.03
See application file for complete search history.

(56) References Cited

U.S. PATENT DOCUMENTS

| | | | | |
|---|---|---|---|---|
| 8,570,273 | B1* | 10/2013 | Smith | G06F 3/0338 |
| | | | | 345/156 |
| D772,986 | S | 11/2016 | Chen et al. | |
| 9,913,525 | B2* | 3/2018 | Mine | A45F 5/00 |
| 10,139,966 | B2* | 11/2018 | Pelis | G06F 3/044 |
| 10,347,144 | B2* | 7/2019 | Subiakto | G06F 3/04817 |
| 10,459,495 | B2* | 10/2019 | Griffin | G06F 3/014 |
| 10,585,497 | B2* | 3/2020 | Park | G06F 3/017 |
| 2002/0171625 | A1 | 11/2002 | Rothchild | |
| 2003/0038783 | A1* | 2/2003 | Baughman | G06F 3/03543 |
| | | | | 345/163 |
| 2004/0142749 | A1 | 7/2004 | Ishimaru et al. | |
| 2005/0197205 | A1 | 9/2005 | Hale, Jr. | |
| 2006/0164383 | A1* | 7/2006 | Machin | G05G 9/047 |
| | | | | 345/156 |
| 2007/0091070 | A1 | 4/2007 | C. Larsen et al. | |
| 2008/0042995 | A1 | 2/2008 | Li et al. | |
| 2009/0153477 | A1* | 6/2009 | Saenz | G06F 3/014 |
| | | | | 345/158 |
| 2009/0205878 | A1 | 8/2009 | Taylor | |
| 2010/0328205 | A1* | 12/2010 | Cheng | G06F 3/014 |
| | | | | 345/157 |
| 2011/0037695 | A1 | 2/2011 | Bor et al. | |
| 2011/0157019 | A1 | 6/2011 | Miura et al. | |
| 2013/0178293 | A1 | 7/2013 | Nakayama et al. | |
| 2013/0215024 | A1 | 8/2013 | Nakayama et al. | |
| 2013/0324254 | A1 | 12/2013 | Huang et al. | |
| 2014/0018173 | A1 | 1/2014 | Urhman | |
| 2014/0282051 | A1 | 9/2014 | Cruz-Hernandez et al. | |
| 2015/0065090 | A1 | 3/2015 | Yeh | |
| 2015/0100204 | A1 | 4/2015 | Gondo | |
| 2016/0026216 | A1 | 1/2016 | Novet | |
| 2016/0179338 | A1 | 6/2016 | Miller | |
| 2016/0306422 | A1 | 10/2016 | Parham et al. | |
| 2016/0357261 | A1 | 12/2016 | Bristol et al. | |
| 2016/0363996 | A1 | 12/2016 | Higgins et al. | |
| 2016/0364910 | A1 | 12/2016 | Higgins et al. | |
| 2017/0003798 | A1 | 1/2017 | Peng et al. | |
| 2017/0024007 | A1 | 1/2017 | Pelis et al. | |
| 2017/0131767 | A1 | 5/2017 | Long | |
| 2017/0151494 | A1 | 6/2017 | Ironmonger et al. | |
| 2017/0329440 | A1 | 11/2017 | Sturm et al. | |
| 2018/0004310 | A1 | 1/2018 | Drum | |

FOREIGN PATENT DOCUMENTS

| | | |
|---|---|---|
| JP | 2004-227266 A | 8/2004 |
| WO | WO 2015/153690 A1 | 10/2015 |
| WO | WO 2016/140924 A1 | 9/2016 |

OTHER PUBLICATIONS

European Extended Search Report, European Application No. 17202777.3, dated Mar. 15, 2018, 8 pages.
Extended European Search Report, European Application No. 18184661.9, dated Feb. 12, 2019, 12 pages.
PCT International Search Report and Written Opinion, PCT Application No. PCT/US2018/012207, dated Sep. 13, 2018, 13 pages.
PCT International Search Report and Written Opinion, PCT Application No. PCT/US2017/037608, dated Jan. 25, 2018, 15 pages.
PCT International Search Report and Written Opinion, PCT Application No. PCT/US2017/031974, dated Jan. 2, 2018, 16 pages.
PCT International Search Report and Written Opinion, PCT Application No. PCT/US2017/037638, dated Nov. 27, 2017, 12 pages.
United States Office Action, U.S. Appl. No. 15/858,416, dated Nov. 1, 2019, 11 pages.
European Patent Office, Office Action, European Application No. 17202777.3, dated Feb. 18, 2020, 6 pages.
European Patent Office, Office Action, European Application No. 18184661.9, dated Apr. 28, 2020, 7 pages.

* cited by examiner

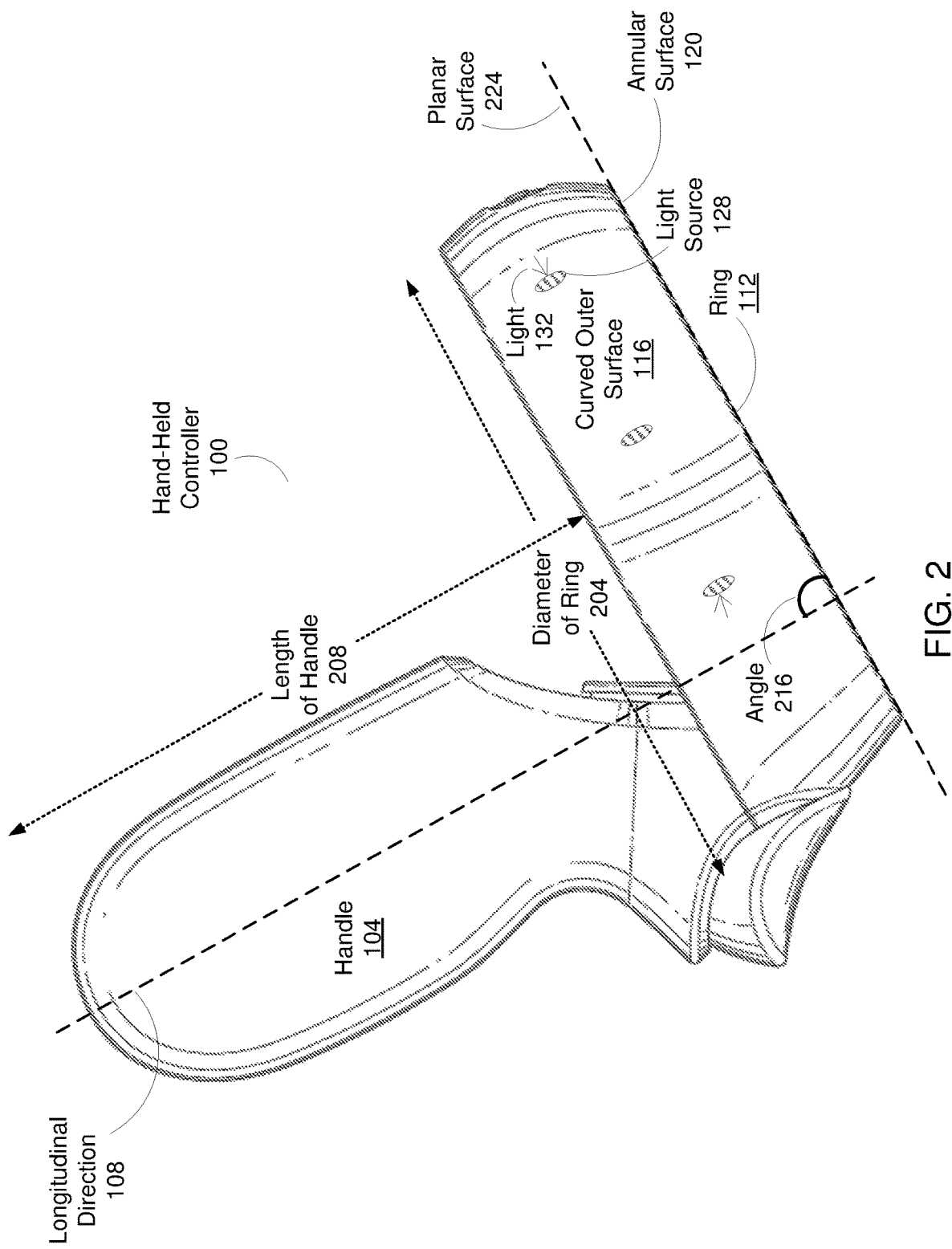

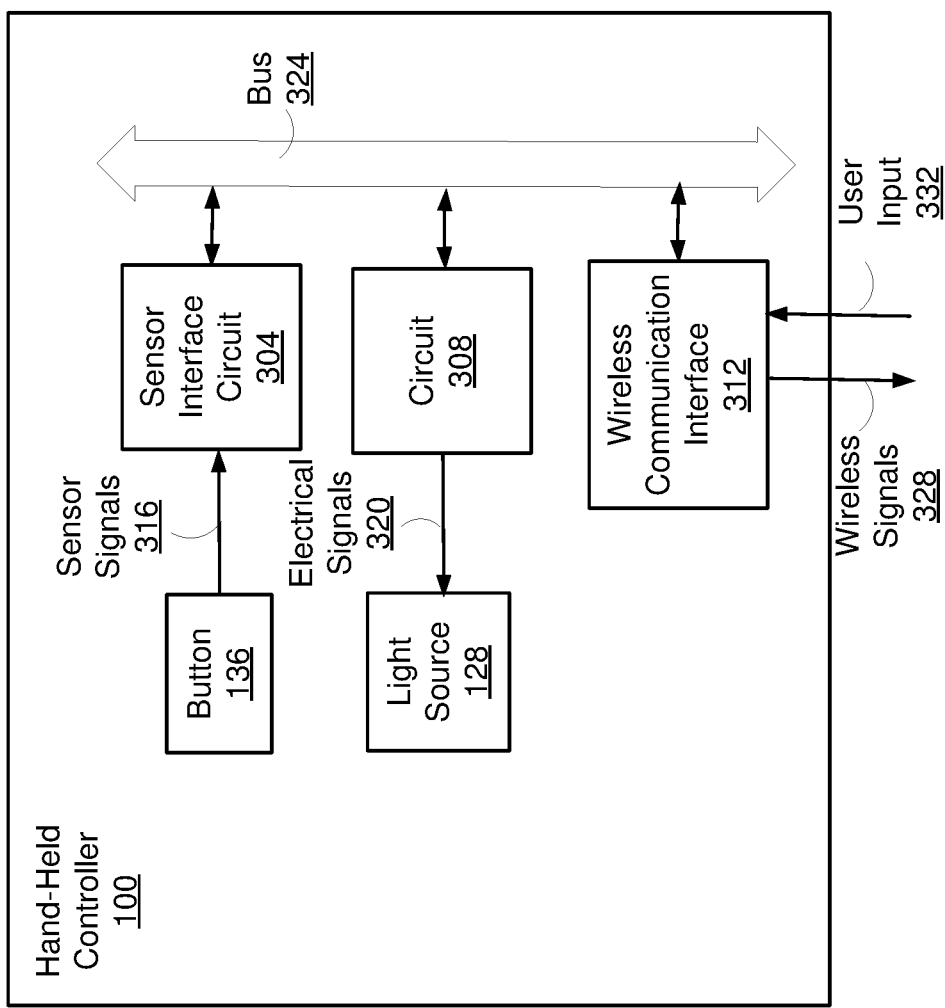

HAND-HELD CONTROLLER USING LED TRACKING RING

CROSS REFERENCE TO RELATED APPLICATION

This application is a continuation of co-pending U.S. application Ser. No. 15/498,402, filed Apr. 26, 2017, which is incorporated by reference in its entirety.

BACKGROUND

Field of the Disclosure

The present disclosure generally relates to virtual reality (VR) controllers, and specifically to a hand-held controller using an LED tracking ring.

Description of the Related Arts

VR systems may include a controller to translate movement of the user's body into tangible action in a virtual world. Some controllers provide vibration feedback to Android or iOS VR headsets for motion-based gaming. A controller may be equipped with a gyroscope, an accelerometer, or terrestrial magnetic field sensor to trace motion back to a game, allowing intuitive gameplay as if the player is within the game.

SUMMARY

Embodiments relate to a hand-held controller to track a user's hand motion, position, natural gestures, and finger movement to create a sense of hand presence for more realistic and tactile VR. The controller may let the user make social gestures like point, wave, and give a thumbs-up or manipulate objects in the virtual space, pick up toys or fire laser guns with intuitive, natural hand movement.

In one embodiment, the hand-held controller includes a handle extending in a longitudinal direction. The handle is shaped and dimensioned to be grasped by a user's hand. A ring is attached to an end of the handle and surrounds a thumb of the user when the handle is grasped by the user's hand. The ring has an annular surface that defines a plane that forms a predetermined angle with respect to the longitudinal direction, and a curved outer surface. Light sources are mounted on the curved outer surface and configured to emit light to be captured by an imaging device for tracking a position or orientation of the hand-held controller. The light is emitted in a direction normal to the curved outer surface.

In one embodiment, the handle has a cylindrical shape.

In one embodiment, the hand-held controller includes a button located on a bottom surface of the handle. The button may be pressed by an index or middle finger of the user's hand.

In one embodiment, the button has a symmetrical shape.

In one embodiment, the predetermined angle is between 45° to 135°.

In one embodiment, a preferred ratio of a diameter of the ring to a length of the handle is 9:10.

In one embodiment, the light sources are light-emitting diodes.

In one embodiment, the handle is made of engineering plastic.

In one embodiment, the ring is made of engineering plastic.

In one embodiment, the hand-held controller includes a sensor interface circuit to receive sensor signals from a button located on a bottom surface of the handle. The button generates the sensor signals responsive to being pressed by an index or a middle finger of the user's hand.

In one embodiment, the hand-held controller includes a circuit to provide electrical signals to the light sources.

In one embodiment, the hand-held controller includes a wireless communication interface to transmit wireless signals indicating user input received from the user's hand.

BRIEF DESCRIPTION OF THE DRAWINGS

The teachings of the embodiments can be readily understood by considering the following detailed description in conjunction with the accompanying drawings.

Figure (FIG. 1 is an example schematic perspective view of a hand-held controller, in accordance with an embodiment.

FIG. 2 is an example schematic side view of the hand-held controller, in accordance with an embodiment.

FIG. 3 is an example schematic block diagram of the hand-held controller, in accordance with an embodiment.

Figure 1:
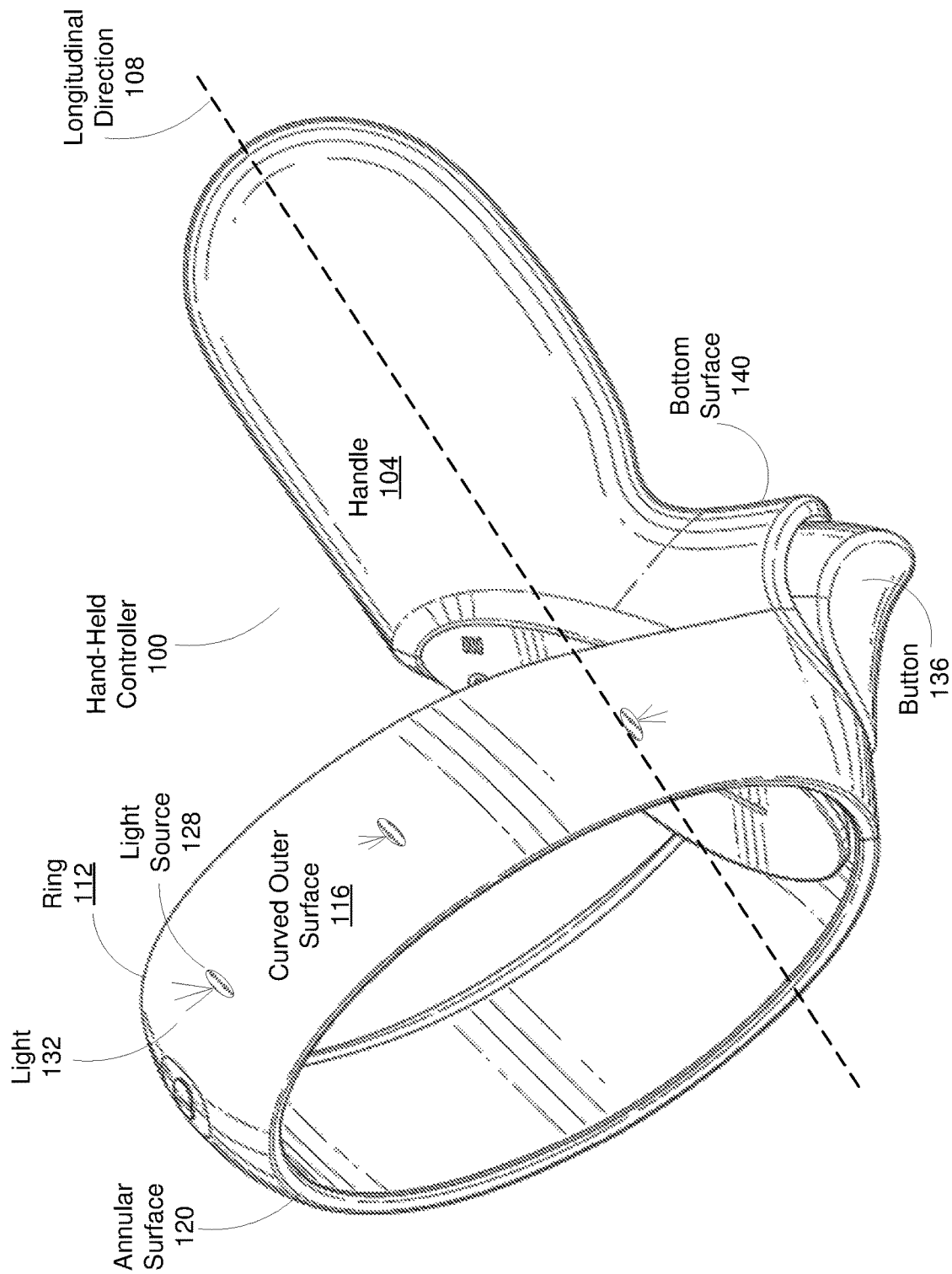

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a hand-held VR controller to track a user's hand motion and position. The hand-held controller includes a handle extending in a longitudinal direction. A ring is attached to an end of the handle and has a curved outer surface. Light sources are mounted on the curved outer surface and configured to emit light to be captured by an imaging device for tracking a position or orientation of the hand-held controller.

Example Schematic Perspective View of Hand-Held Controller

FIG. 1 is an example schematic perspective view of a hand-held controller 100, in accordance with an embodiment. The hand-held controller 100 may be included in a VR system as a stand-alone controller or as part of a pair of tracked controllers that give a user "hand presence"—the feeling that the user's virtual hands are actually his own. The hand-held controller 100 may enable the user to manipulate objects in a virtual space with precision and intuitive, natural hand movement.

The hand-held controller 100 includes a handle 104 extending in a longitudinal direction 108. In one embodiment, the handle 104 may be made of an engineering plastic, such as injection-molded polycarbonate (PC)/acrylonitrile butadiene styrene (ABS) or polyamide (nylon). In other embodiments, the handle 104 may be made of wood or metal. The handle 104 may be resistant to impact and abrasion. The material of the handle 104 may exhibit heat resistance, mechanical strength, or rigidity.

The handle 104 is shaped and dimensioned to be grasped by a user's hand for tracking natural gestures and finger movements to create more realistic and tactile VR. For example, the handle may have a cylindrical shape. The handle 104 of the hand-held controller 100 may bend or curve to balance the weight of the controller 100, such that it rests naturally in the top of the palm of the user or the crook of the user's fingers. The user may therefore comfortably hold the hand-held controller 100 without dropping it. Even if the user tries to open his hand completely when holding the hand-held controller 100 normally, the user's fingers may catch on the ring 112 and support the hand-held controller 100's weight. The ring 112 is attached to an end of the handle 104 and has an annular surface 120. The ring may be made of engineering plastic. In one embodiment, the ring is made of infrared-transparent polycarbonate. The ring 112 may surround a thumb of the user when the handle 104 is grasped by the user's hand.

The ring 112 has a curved outer surface 116, as illustrated in FIG. 1. Light sources 128 are mounted on the curved outer surface 116 to emit light 132 to be captured by an imaging device for tracking a position or orientation of the hand-held controller 100. The light 132 is emitted in a direction normal to the curved outer surface 116. The light sources 128 may be light-emitting diodes. A light-emitting diode 128 is a two-lead semiconductor light source, such as a p-n junction diode, which emits light 132 when receiving an electrical signal. A VR system may include a camera to track a position or orientation of the hand-held controller 100 by capturing the emitted light 132. For example, a camera may be mounted on a computer monitor covering a field of view including the hand-held controller 100.

The hand-held controller 100 may include a trigger button 136 located on a bottom surface 140 of the handle 104. The trigger button 136 may be pressed by an index or middle finger of the user's hand. The trigger button 136 may provide a signal for grasping, lifting, etc., of virtual objects in a VR space. The trigger button 136 may have a symmetrical shape, such as rectangular, elliptical or circular. The trigger button 136 may be made of rubber or plastic.

Example Schematic Side View of Hand-Held Controller

FIG. 2 is an example schematic side view of the hand-held controller 100, in accordance with an embodiment. The annular surface 120 of the ring 112, illustrated and described above with reference to FIG. 1, defines a plane 224 that forms a predetermined angle 216 with respect to the longitudinal direction 108 in which the handle 104 extends. The predetermined angle 216 may be between 45° to 135°. With the ring geometry illustrated in FIG. 2, if the predetermined angle 216 is more than 45°, this avoids interference with the thumb movement of the user. If the predetermined angle 216 is less than 135°, this avoids any affects to the inside-out tracking visibility to a camera mounted on an HMD.

In embodiments, a preferred ratio of a diameter 204 of the ring 112 to a length 208 of the handle 104 is 9:10. The preferred ratio of the diameter 204 of the ring 112 to a length 208 of the handle 104 reduces the ring size while allowing thumb clearance for a 95th percentile male user. The handle 104 grip is sized such that it may be used by a 5th percentile female user.

Example Schematic Block Diagram of Hand-Held Controller

FIG. 3 is an example schematic block diagram of the hand-held controller 100, in accordance with an embodiment. The hand-held controller 100 includes the trigger button 136, a sensor interface circuit 304, light source 128, a circuit 308, a wireless communication interface 312, and a bus 324. In alternative configurations, different and/or additional components may be included in the hand-held controller 100, such as a memory, central processing unit, battery, Bluetooth component, USB input, etc.

The sensor interface circuit 304 is a digital, analog, or mixed-signal circuit to receive sensor signals 316 in the form of voltage or current from the trigger button 136 when the trigger button 136 is pressed by the user. The button 136 generates the sensor signals 316 responsive to being pressed by an index or a middle finger of the user's hand. The trigger button 136 may be connected to a transducer that converts the mechanical motion of the trigger button 136 into the sensor signals 316. The hand-held controller 100 may include a circuit 308 to provide electrical signals 320, such as voltage, to the light sources 128. The circuit 308 may be powered by a battery on the hand-held controller 100 to generate the electrical signals 320. The light sources emit the light 132 responsive to receiving the electrical signals 320.

The hand-held controller 100 may include a wireless communication interface 312, which may be a digital, analog, or mixed-signal circuit to transmit wireless signals 328 indicating user input 332 received from the user's hand. The wireless signals 328 may be transmitted to a head-mounted display, a computer, a VR system, etc. The wireless communication interface 312 may send and receive data via a wireless network without the need for connecting cables to the hand-held controller 100. In one embodiment, the wireless communication interface 312 may support the USB 1.1 and 802.11b wireless network standards up to 11 Mbps data transfer rates. In one embodiment, the wireless communication interface 312 may support the USB 2.0 and 802.11g standards up to 54 Mpbs data transfer rates. In one embodiment, the wireless communication interface 312 may be a Compact Flash (CF) wireless network adapter use infrared technology for data exchanges between the hand-held controller 100 and a computer, etc. The wireless communication interface 412, the sensor interface circuit 304, and the circuit 308 may communicate via the bus 324.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A hand-held controller comprising:
   a handle extending in a longitudinal direction;
   a ring attached to a distal end of the handle, the ring defining a plane that forms a predetermined angle with respect to the longitudinal direction, the ring having a curved outer surface; and
   a plurality of electromagnetic wave sources mounted at different locations on the curved outer surface and configured to emit electromagnetic waves to be captured by an imaging device for tracking a position or orientation of the hand-held controller.

2. The hand-held controller of claim 1, wherein the electromagnetic waves are emitted in directions radially outward from the curved outer surface.

3. The hand-held controller of claim 1, wherein at least one of the electromagnetic waves is emitted in a direction normal to the curved outer surface.

4. The hand-held controller of claim 1, wherein at least one of the plurality of electromagnetic sources is a light source and at least one of the electromagnetic waves is light.

5. The hand-held controller of claim 1, wherein at least one of the plurality of electromagnetic sources is an infrared source and at least one of the electromagnetic waves is infrared.

6. The hand-held controller of claim 1, further comprising a button located on a bottom surface of the handle, the button configured for pressing by an index or middle finger of a user's hand.

7. The hand-held controller of claim 1, wherein the predetermined angle is between 45° to 135°.

8. The hand-held controller of claim 1, wherein a preferred ratio of a diameter of the ring to a length of the handle is 9:10.

9. The hand-held controller of claim 1, further comprising a sensor interface circuit configured to receive sensor signals from a button located on a bottom surface of the handle, the button configured to generate the sensor signals responsive to being pressed by an index or a middle finger of a user's hand.

10. The hand-held controller of claim 1, further comprising a circuit configured to provide electrical signals to the plurality of electromagnetic wave sources.

11. The hand-held controller of claim 1, further comprising a wireless communication interface configured to transmit wireless signals indicating user input received from a user's hand.

12. The hand-held controller of claim 1, wherein the ring is configured to surround a thumb of a user gripping the hand-held controller.

13. A system, comprising:
   a hand-held controller comprising:
      a handle extending in a longitudinal direction;
      a ring attached to a distal end of the handle, the ring defining a plane that forms a predetermined angle with respect to the longitudinal direction, the ring having a curved outer surface; and
      a plurality of electromagnetic wave sources mounted at different locations on the curved outer surface and configured to emit electromagnetic waves; and
   an imaging device configured to capture one or more of the electromagnetic waves for tracking a position or orientation of the hand-held controller.

14. The system of claim 13, wherein the electromagnetic waves are emitted in directions radially outward from the curved outer surface.

15. The system of claim 13, wherein at least one of the electromagnetic waves is emitted in a direction normal to the curved outer surface.

16. The system of claim 13, wherein at least one of the plurality of electromagnetic sources is a light source and at least one of the electromagnetic waves is light.

17. The system of claim 13, wherein at least one of the plurality of electromagnetic sources is an infrared source and at least one of the electromagnetic waves is infrared.

18. The system of claim 13, further comprising a sensor interface circuit configured to receive sensor signals from a button located on a bottom surface of the handle, the button configured to generate the sensor signals responsive to being pressed by an index or a middle finger of a user's hand.

19. The system of claim 13, further comprising a circuit configured to provide electrical signals to the plurality of electromagnetic wave sources.

20. The system of claim 13, further comprising a wireless communication interface configured to transmit wireless signals indicating user input received from a user's hand.

* * * * *